(12) United States Patent
Pai et al.

(10) Patent No.: US 8,920,185 B2
(45) Date of Patent: Dec. 30, 2014

(54) ELECTRONIC DEVICE ASSEMBLY STRUCTURE

(71) Applicant: Gemtek Technology Co., Ltd., Hsinchu County (TW)

(72) Inventors: Tsung-Hsi Pai, Hsinchu County (TW); Yuh-Sheng Chan, Hsinchu County (TW); Chih-Hsu Yen, Hsinchu County (TW)

(73) Assignee: Gemtek Technology Co., Ltd., Hukou Township, Hsinchu County (TW)

( * ) Notice: Subject to any disclaimer, the term of this patent is extended or adjusted under 35 U.S.C. 154(b) by 8 days.

(21) Appl. No.: 13/705,913

(22) Filed: Dec. 5, 2012

(65) Prior Publication Data

US 2013/0280940 A1 Oct. 24, 2013

(30) Foreign Application Priority Data

Apr. 20, 2012 (TW) .............................. 101114117 A

(51) Int. Cl.
 *H01R 13/62* (2006.01)
 *G06F 3/00* (2006.01)
 *H01R 31/00* (2006.01)
 *H01R 24/62* (2011.01)

(52) U.S. Cl.
 CPC *H01R 13/62* (2013.01); *G06F 3/00* (2013.01); *H01R 31/005* (2013.01); *H01R 24/62* (2013.01); *H01R 2201/06* (2013.01)
 USPC ....... 439/345; 439/638; 439/639; 361/679.02

(58) Field of Classification Search
 CPC ........................................................ H01R 13/62
 USPC ................................ 439/345, 752.5; 361/732
 See application file for complete search history.

(56) References Cited

U.S. PATENT DOCUMENTS

| | | | | |
|---|---|---|---|---|
| 6,141,221 | A * | 10/2000 | Tong et al. | 361/724 |
| 6,512,671 | B1 * | 1/2003 | Okano et al. | 361/679.4 |
| 6,726,509 | B2 * | 4/2004 | Milan | 439/752.5 |
| 6,843,684 | B2 * | 1/2005 | Milan | 439/606 |
| 6,905,374 | B2 * | 6/2005 | Milan | 439/752.5 |
| 7,099,151 | B2 * | 8/2006 | Jones et al. | 361/679.02 |
| 7,329,152 | B2 * | 2/2008 | Mori et al. | 439/638 |

\* cited by examiner

*Primary Examiner* — Lisa Lea Edmonds
*Assistant Examiner* — Rashen E Morrison
(74) *Attorney, Agent, or Firm* — Muncy, Geissler, Olds & Lowe, P.C.

(57) ABSTRACT

An electronic device assembly structure comprises two electronic devices and at least one connection module. Each electronic device includes a body and at least one USB located on the body. The connection module connects to the two electronic devices and includes an electric connection unit and a fastening unit. The electric connection unit is electrically inserted into the USBs of the two electronic devices. The fastening unit fastens the bodies of the two electronic devices together in an integrated manner.

4 Claims, 8 Drawing Sheets

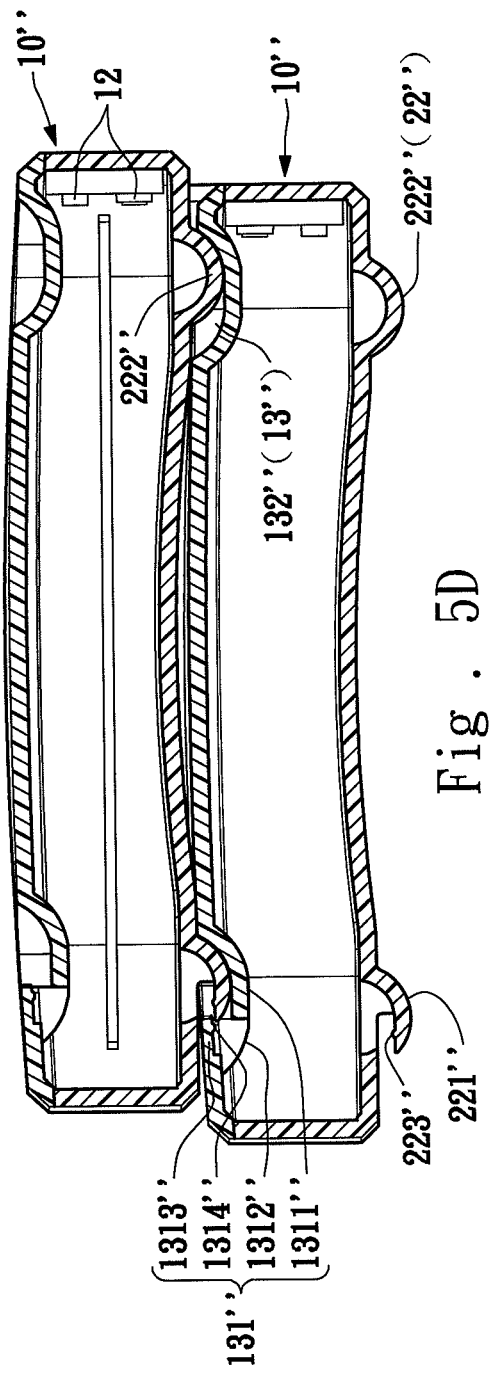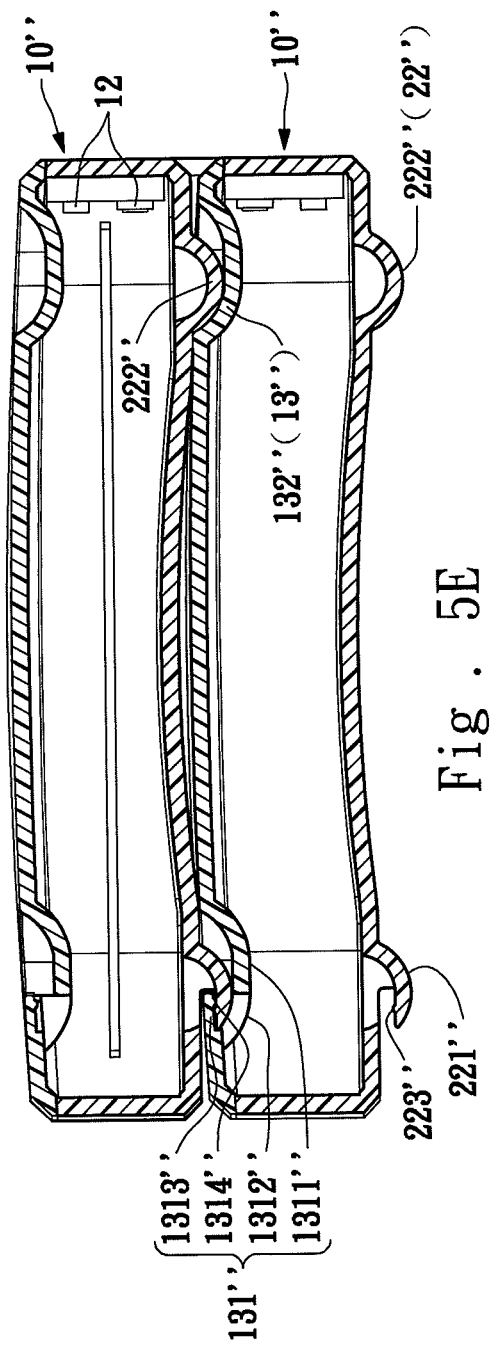
Fig. 5D
Fig. 5E

ELECTRONIC DEVICE ASSEMBLY STRUCTURE

FIELD OF THE INVENTION

The present invention relates to an electronic device assembly and particularly to an electronic device assembly structure equipped with modular electronic devices and connection modules.

BACKGROUND OF THE INVENTION

People living in the modern time are swamped with prolific electronic products, among them computers are the most important. These days a growing number of electronic devices are linked to the computers to transmit power or data.

Conventional electronic devices are formed in various shapes. When in use to align them neatly and connect them are not easy. A lot of space also is wasted unnecessarily. Moreover, different profiles of electronic devices require different molds during fabrication. Fabrication costs are higher and repairs and maintenance also are difficult.

Furthermore, different electronic devices must be connected individually to a computer via multiple connection lines. This is unsightly and occupies a lot of insertion slots. All these show that there are still rooms for improvement.

SUMMARY OF THE INVENTION

In view of the aforesaid problems, the present invention provides an electronic device assembly structure which includes two electronic devices and at least one connection module. Each electronic device includes a body and at least one Universal Serial Bus (USB) located on the body. The connection module is connected to the two electronic devices and includes an electric connection unit and a fastening unit. The electric connection unit is electrically inserted into the USBs of the two electronic devices. The fastening unit fastens the bodies of the two electronic devices together in an integrated manner.

In short, the electronic device assembly structure of the invention can fasten a plurality of electronic devices in an integrated manner through only a connection module to save assembly time and manpower. Moreover, during assembly all the elements are visible clearly, thus can reduce assembly error and damage of the elements.

In addition, the electronic devices and connection module of the invention adopt modular design, hence can reduce fabrication difficulty and achieve product consistency. Redundant mold making and circuit design are unnecessary. Hence production cost can be greatly reduced.

Moreover, through the electronic device assembly structure of the invention, the number of electronic devices can be increased or decreased (to add or reduce the function of the electronic device assembly structure) according to user's requirements, hence can be widely used.

The foregoing, as well as additional objects, features and advantages of the invention will be more readily apparent from the following detailed description, which proceeds with reference to the accompanying drawings. The descriptions and drawings serve merely for illustrative purpose and are not the limitations of the invention.

BRIEF DESCRIPTION OF THE DRAWINGS

FIG. 5D is a sectional view of yet another embodiment of the electronic device assembly structure of the invention in an assembly condition.

FIG. 5E is a sectional view of yet another embodiment of the electronic device assembly structure of the invention in another assembly condition.

DETAILED DESCRIPTION OF THE PREFERRED EMBODIMENTS

First Embodiment

Figure 1:
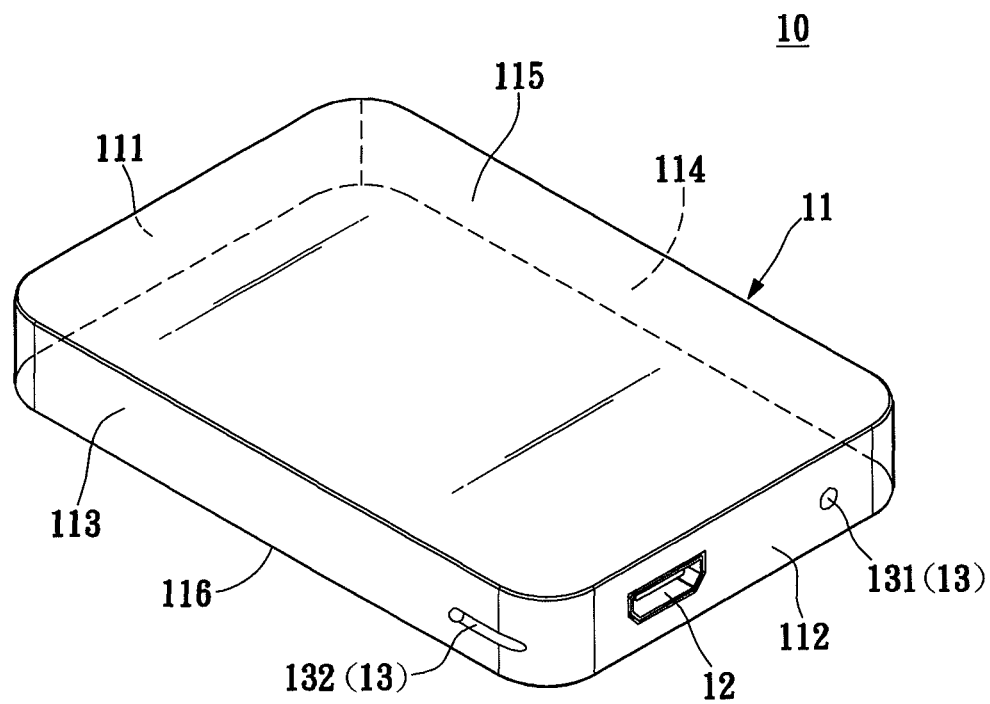
FIG. 1 is a perspective view of an electronic device of the invention.

It is to be noted that in the following discussion two electronic devices 10 are taken as an example. But the actual number of the electronic devices can be adjusted according to product design requirements. Hence the discussed example shall not be deemed as the limitation of the invention.

Please refer to FIGS. 1, 2, 3A and 3B for an embodiment of an electronic device assembly structure of the invention. In this embodiment one electronic device 10 is stacked over another electronic device 10. Each electronic device 10 includes a body 11 and at least one USB 12 located on the body 11. Multiple connection modules 20 can be used to fasten multiple electronic devices 10. Each connection module 20 includes an electric connection unit 21 and a fastening unit 22. The electric connection unit 21 is electrically inserted into the USBs 12 of the two electronic devices 10. The fastening unit 22 fastens the bodies 11 of the two electronic devices 10 together in an integrated manner.

In this embodiment, the USB 12 is located on the body 11 and exposed on an outer wall of the body 11 to form electric connection with the electric connection unit 21. The body 11 further has a coupling portion 13 to connect to the fastening unit 22. The coupling portion 13 has a positioning hole 131 and at least two guide slots 132. The positioning hole 131 is adjacent to the USB 12. The two guide slots 132 are adjacent to the positioning hole 131 and USB 12, and can be located on the outer wall of the body 11.

To facilitate discussion of the electronic device assembly structure 1 of the invention, the outer wall of the body 11 is further divided into a front wall 111, a rear wall 112, a left wall 113, a right wall 114, an upper wall 115 and a lower wall 116. The USB 12 and positioning hole 131 are located on the rear wall 112 of the body 11 and spaced from each other. The two guide slots 132 are located on the left wall 113 and right wall 114. It is to be noted that the shape and structure of the body 11 are not restricted, and can be rectangular or cylindrical.

Figure 2:
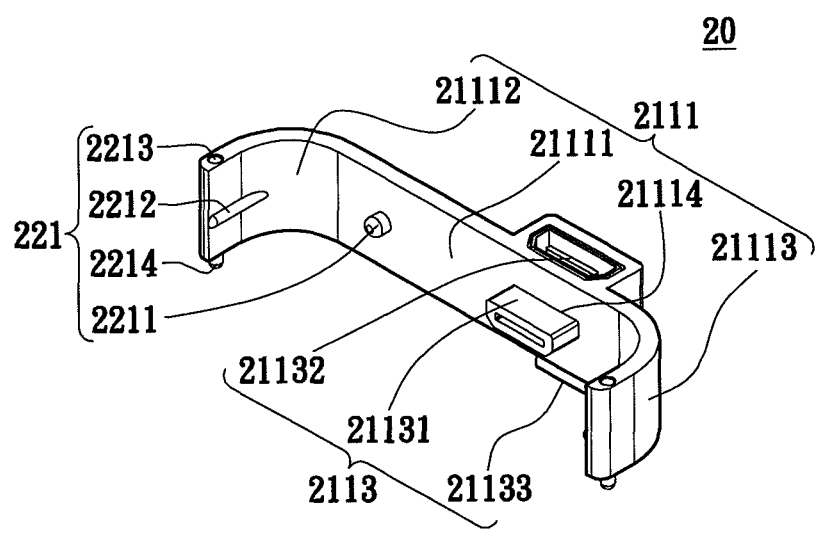
FIG. 2 is a perspective view of a connection module of the invention.
Figure 3A:
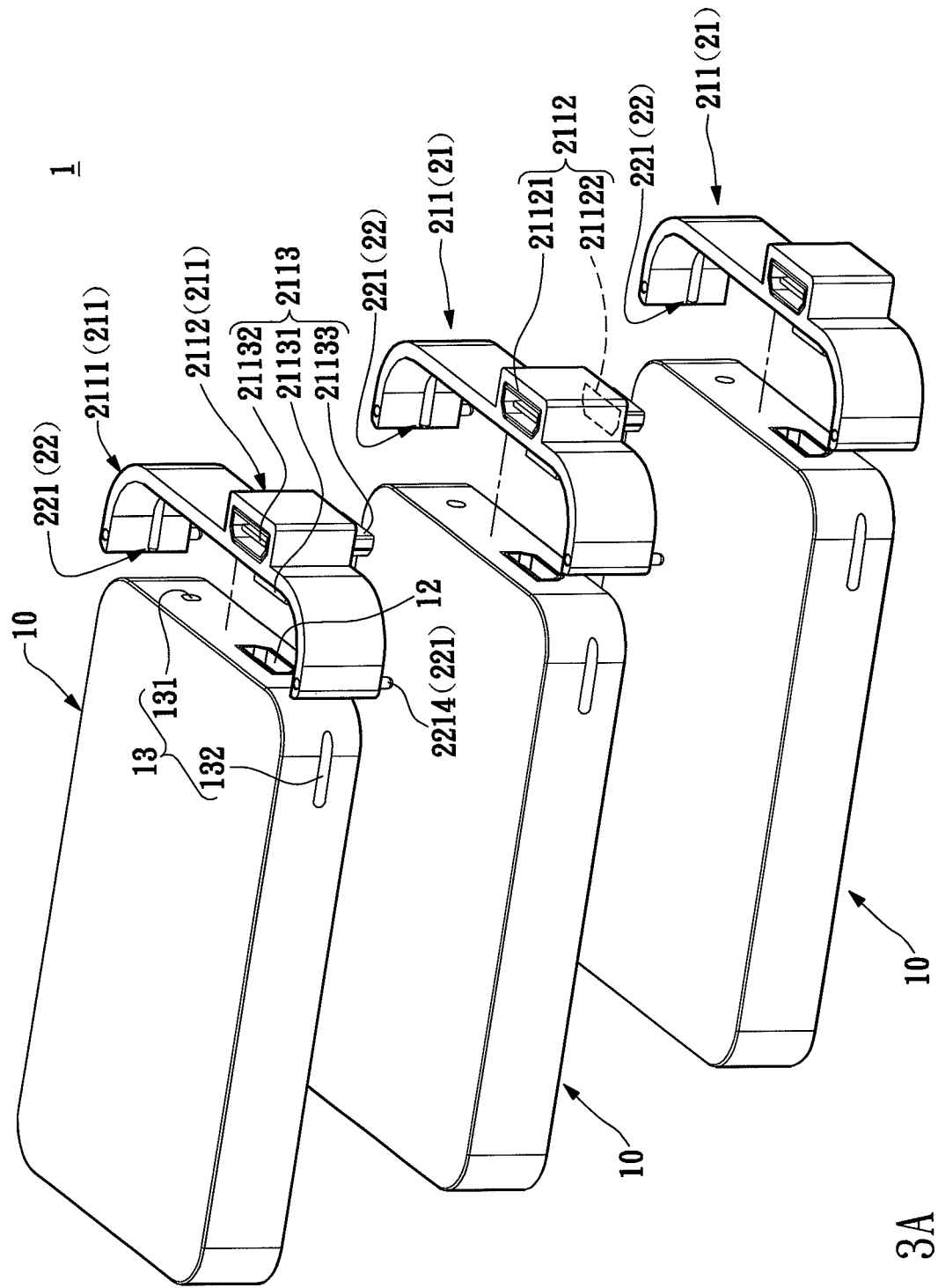
FIG. 3A is an exploded view of an embodiment of the electronic device assembly structure of the invention.
Figure 3B:
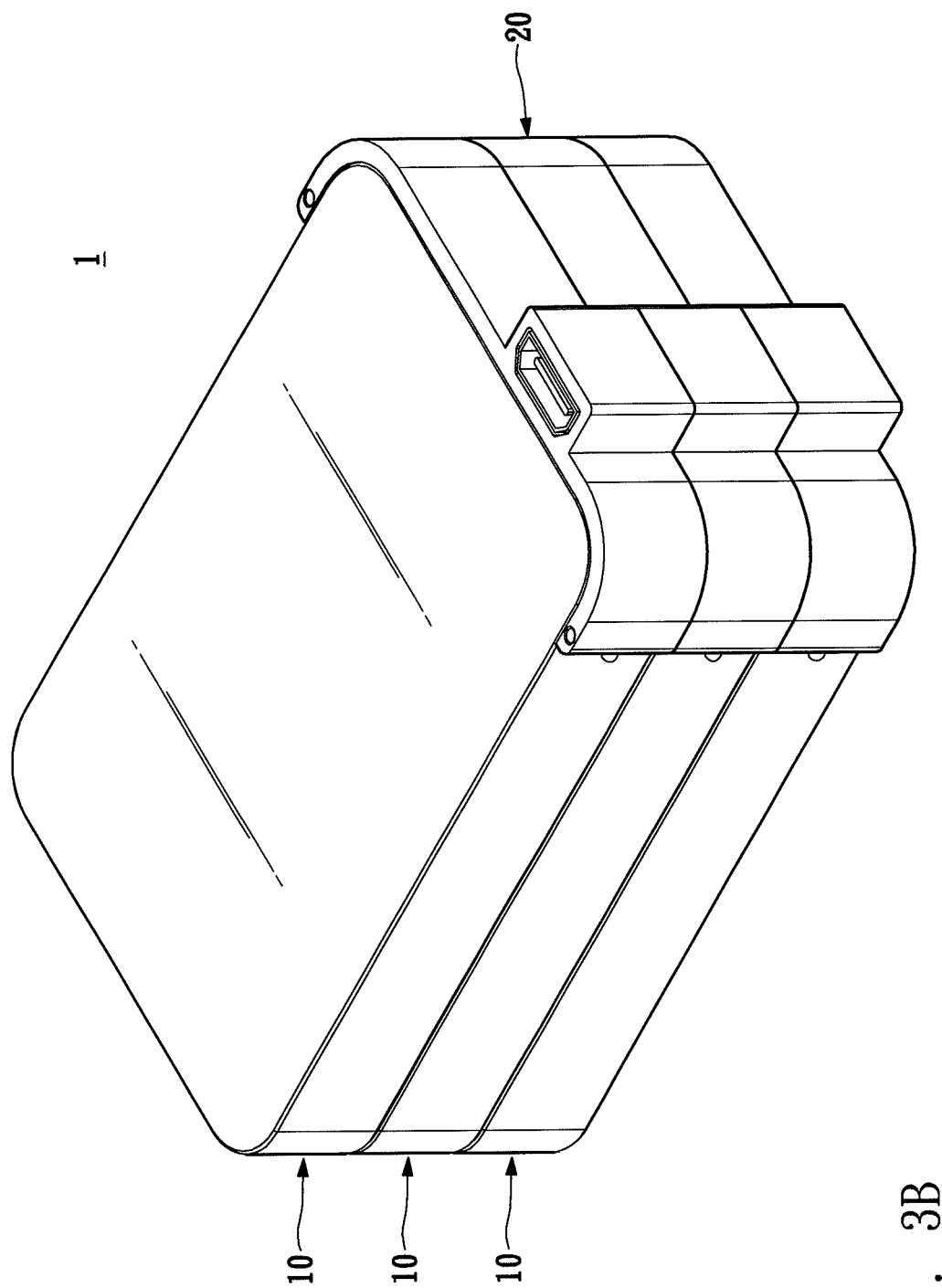
FIG. 3B is a perspective view of an embodiment of the electronic device assembly structure of the invention.

Please refer to FIGS. 2 and 3A, the electric connection module 21 includes at least two electric connection elements 211. Each electric connection element 211 includes a connection seat 2111, a base 2112 and an electric connection portion 2113. The connection seat 2111 is formed in a U shape and has a bottom wall 21111, a first side wall 21112 and a second side wall 21113. The first side wall 21112 and second side wall 21113 are extended respectively from two sides of the bottom wall 21111. Moreover, the bottom wall 21111 further has an aperture 21114. The base 2112 is connected to the bottom wall 21111 opposing the aperture 21114. The base 2112 also has a first opening 21121 and a second opening 21122.

The electric connection portion 2113 is located on the base 2112, and includes a first connection interface 21131, a second connection interface 21132 and a third connection interface 21133. The first connection interface 21131 is extended outside the aperture 21114. The second connection interface 21132 is exposed to the first opening 21121. The third connection interface 21133 is extended outside the second opening 21122. According to actual product requirements conductive terminals (not shown in the drawings) may be provided on the first, second and third connection interfaces 21131, 21132 and 21133 to form electric connection. However, the electric connection method previously discussed is not the limitation of the invention.

More specifically, the first connection interface 21131 can be a male connection interface corresponding to the USB 12, and the second connection interface 21132 corresponds to the third connection interface 21133. For instance, if the second connection interface 21132 is a female connection interface, the third connection interface 21133 is a male connection interface. The first, second and third connection interfaces 21131, 21132 and 21133 can be various types of custom made connection interfaces, such as a mini USB, USB 2.0, USB 3.0, DC plug, audio terminal, video terminal, IEEE 1394, HDMI (High-Definition Multimedia Interface), or handheld electronic product connection interface (such as handset or PDA) or the like.

The fastening unit 22 is located on the electric connection unit 21 and includes at least two fastening couplers 221. Each fastening coupler 221 corresponds to each electric connection element 211. Hence when the electric connection element 211 is electrically inserted into the USBs 12 of the two electronic devices 10, the fastening coupler 221 is inserted into the coupling portion 13 of the electronic devices 10.

More specifically, the fastening coupler 221 includes an anchor strut 2211, at least two guide struts 2212, at least two holding holes 2213 and at least two holding struts 2214. Even more specifically, the anchor strut 2211 is located on an inner surface of the bottom wall 21111 of the electric connection element 211 and spaced from the aperture 21114 at a selected distance. The two guide struts 2212 are located respectively on the inner surfaces of the first side wall 21112 and second side wall 21113. The two holding holes 2213 are formed respectively on the first side wall 21112 and second side wall 21113 of the electric connection element 211 at an upper end of the bottom wall 21111. The two holding struts 2214 are located respectively on the first side wall 21112 and second side wall 21113 of the electric connection element 211 at a lower end of the bottom wall 21111. The holding struts 2214 correspond to the holding holes 2213.

Assembly of the electronic device assembly structure 1 of the invention is discussed below based on two electronic devices 10, two electric connection elements 211 and two fastening couplers 221. The first connection interfaces 21131 of the two electric connection elements 211 are electrically inserted into the USBs 12 of the two electronic devices 10 respectively, and the third connection interface 21133 of one electric connection element 211 is electrically inserted into the second connection interface 21132 of another electric connection element 211; meanwhile, the guide struts 2212 of the fastening couplers 221 are inserted respectively into the guide slots 132 of the two electronic devices 10, and the holding strut 2214 of one fastening coupler 221 is inserted into the holding hole 2213 of another fastening coupler 221.

Thus, the electric connection unit 21 provides electric and signal conduction between the two electronic devices 10 in the electronic device assembly structure 1, and the fastening unit 22 can securely fasten the electric connection unit 21 and the two electronic devices 10. It is to be noted that the number of the electronic devices 10 in the electronic device assembly structure 1 is not limited, and the electronic devices 10 can provide different functions. In other words, when more electronic devices 10 are included in the electronic device assembly structure 1, more functions can be provided. Moreover, through the connection module 20, more electronic devices 10 can be assembled, hence time and manpower for assembling the electronic device assembly structure 1 can be saved. In addition, during assembly all the elements are visible clearly, hence can reduce assembly error and damage of the elements.

Second Embodiment

Figure 4A:
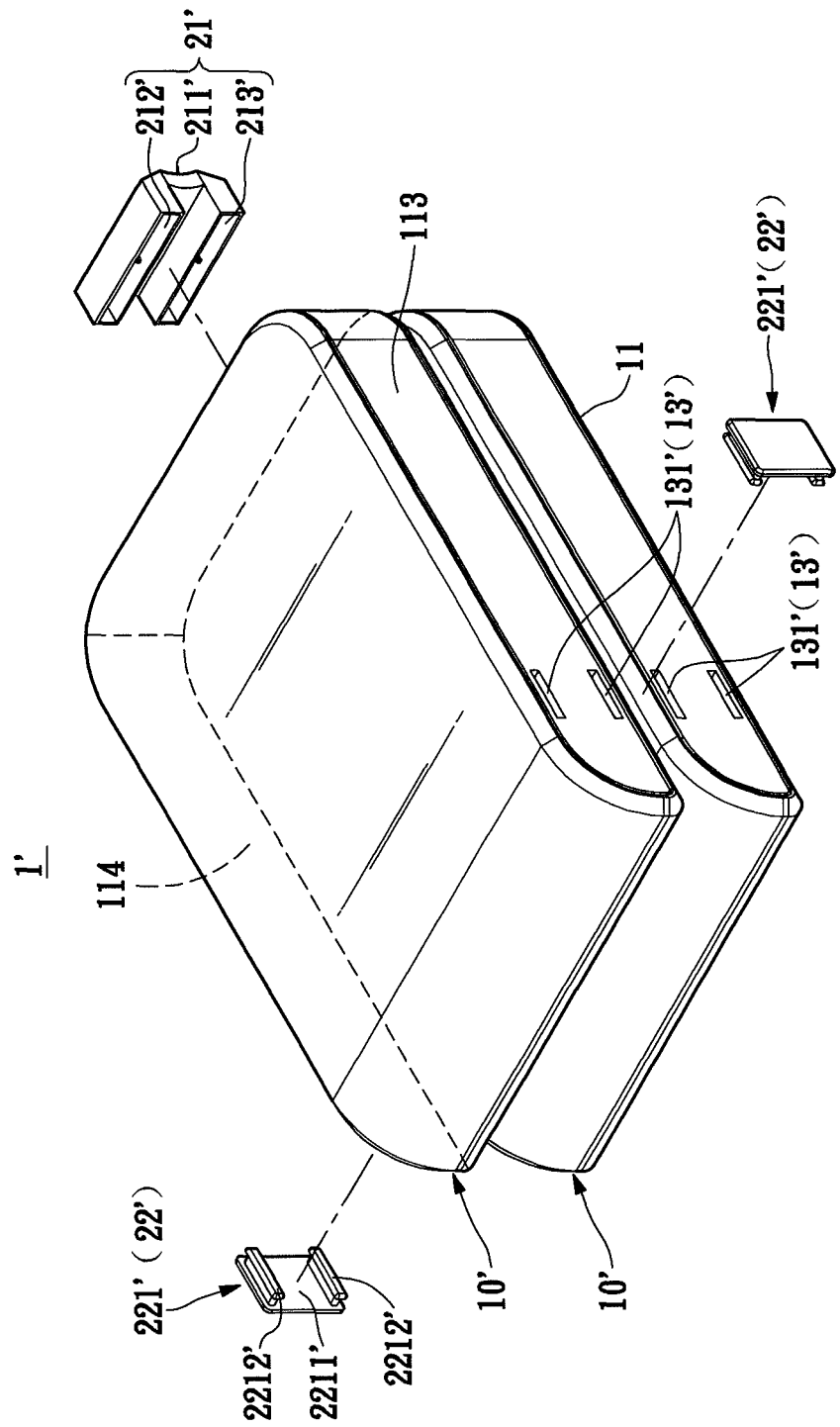
FIG. 4A is an exploded view of another embodiment of the electronic device assembly structure of the invention.
Figure 4B:
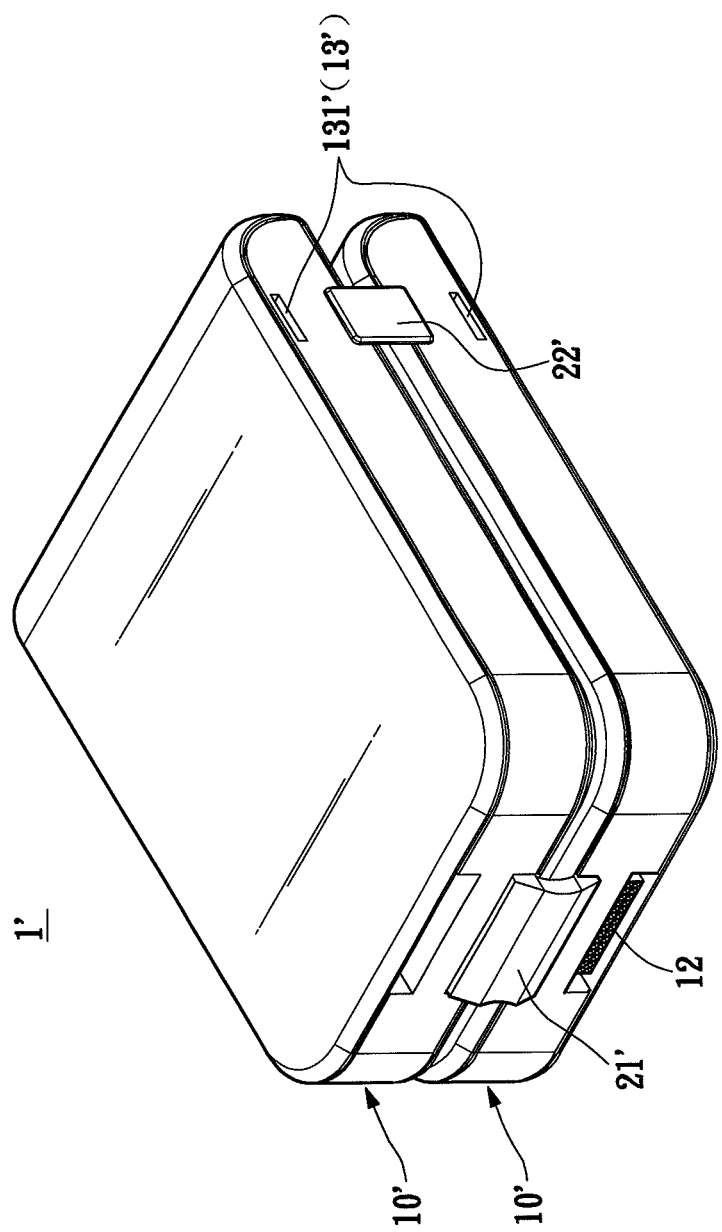
FIG. 4B is a perspective view of another embodiment of the electronic device assembly structure of the invention.
Figure 5A:
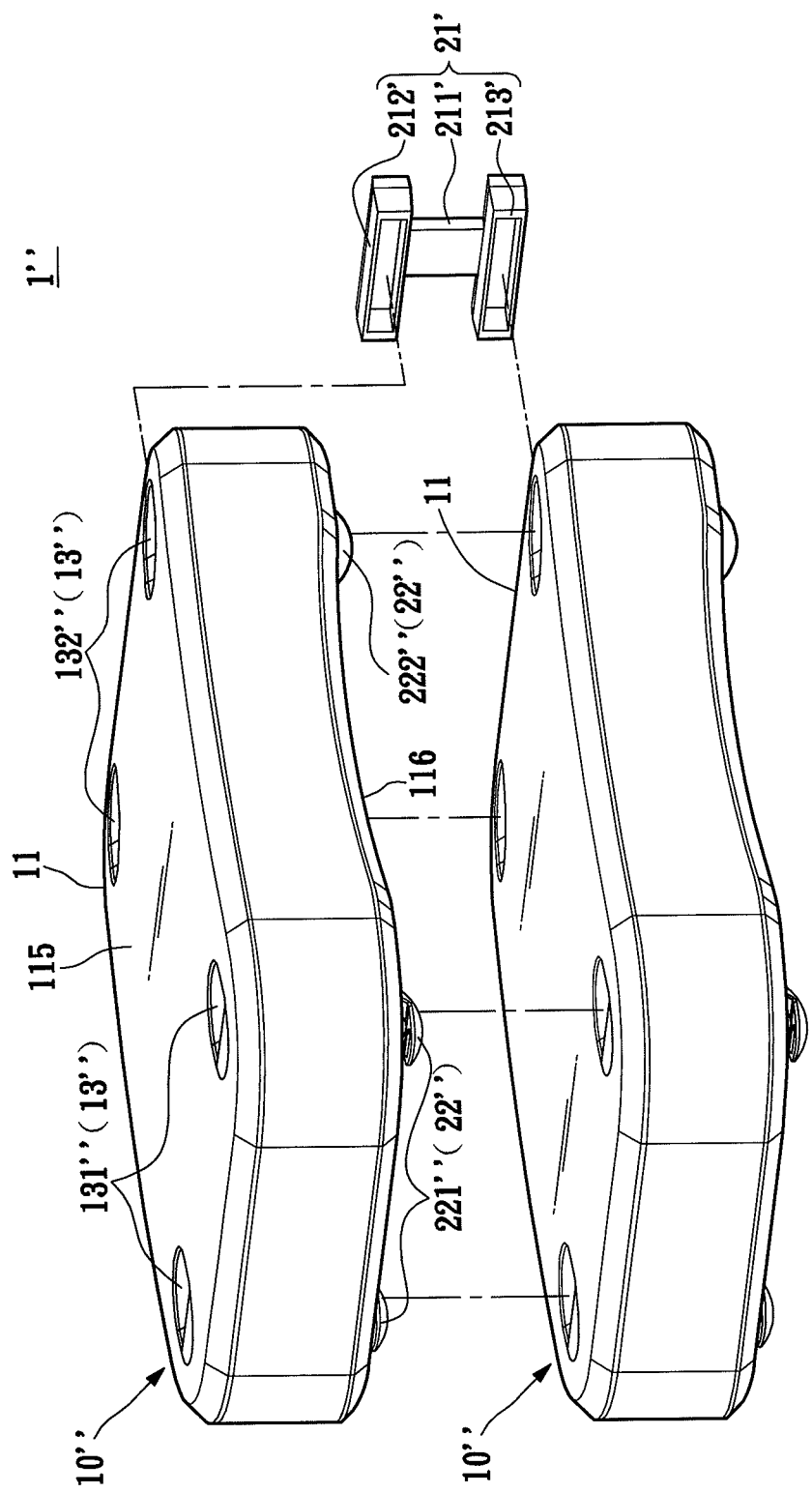
FIG. 5A is an exploded view of yet another embodiment of the electronic device assembly structure of the invention.
Figure 5B:
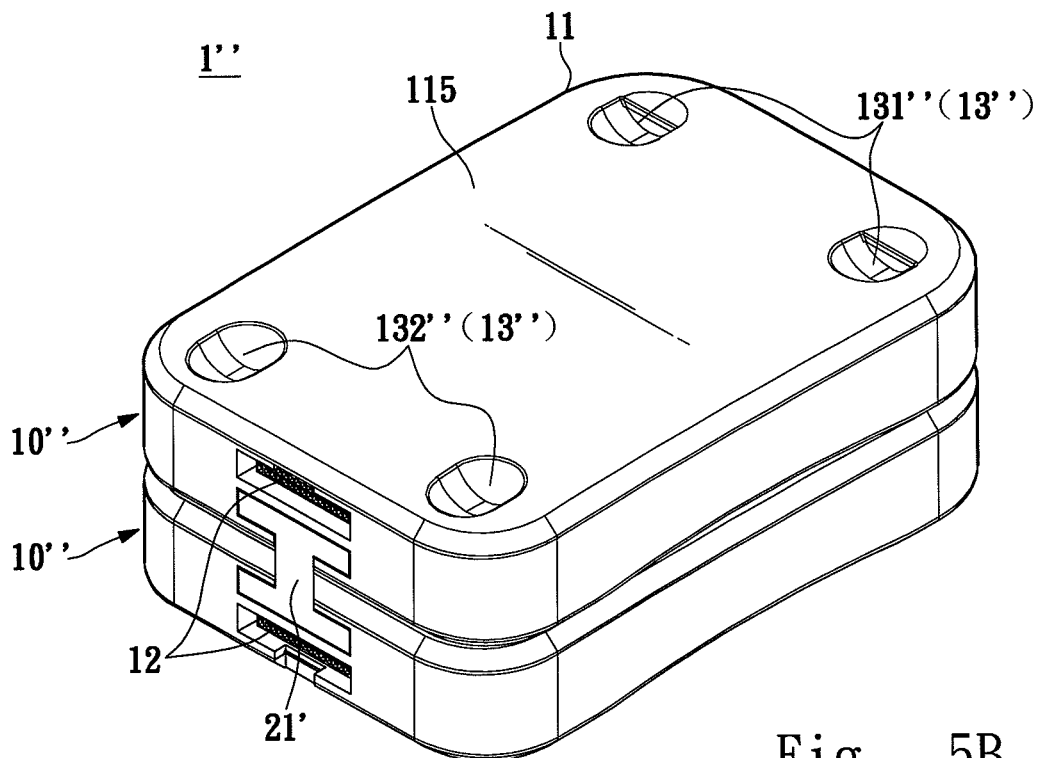
FIG. 5B is a perspective view of yet another embodiment of the electronic device assembly structure of the invention.
Figure 5C:
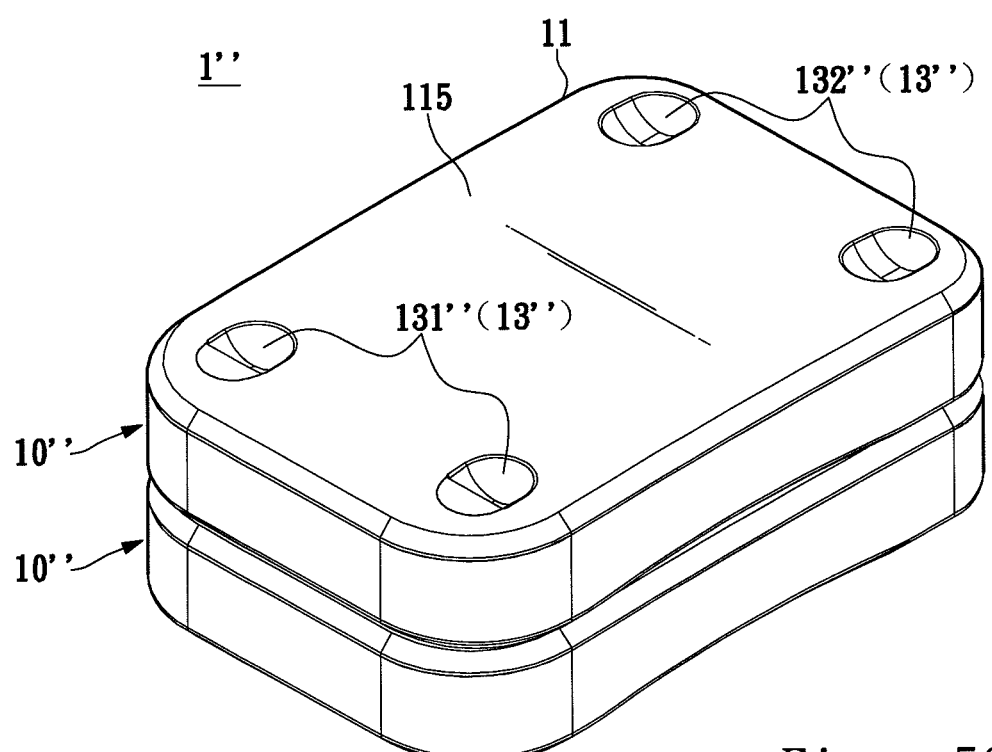
FIG. 5C is another perspective view of yet another embodiment of the electronic device assembly structure of the invention.

Please refer to FIGS. 4A and 4B for another embodiment of the electronic device assembly structure 1' of the invention. It differs from the first embodiment as follows: the coupling portion 13' of the electronic device 10' contains at least four latch slots 131', and the electric connection unit 21' includes an electric connection socket 211', a first electric insertion socket 212' and a second electric insertion socket 213'. The fastening unit 22' is not located on the electric connection unit 21', but can be an independent element.

The four latch slots 131' are located respectively on the left wall 113 and right wall 114 of the electronic device 10' and remote from the USB 12. The first electric insertion socket 212' and second electric insertion socket 213' are extended from two opposite ends of the electric connection socket 211'. The fastening unit 22' includes at least two latch elements 221' each including a connection arm 2211' and latch arms 2212' extended from two ends of the connection arm 2211'.

When the electronic device assembly structure 1' is assembled, the first electric insertion socket 212' is electrically inserted into the USB 12 of one electronic device 10', while the second electric insertion socket 213' is electrically inserted into another USB 12 of another electronic device 10'. Hence one electronic device 10' can form power and signal communication with another electronic device 10' through the electric connection socket 211', and the latch arms 2212' of the two latch elements 221' can latch on the latch slots 131' of the two electronic devices 10' in an integrated manner, thus can prevent the front ends of the two electronic devices 10' from tilting and separating.

Third Embodiment

Please refer to FIGS. 5A through 5E for yet another embodiment of the electronic device assembly structure 1" of the invention. It differs from the second embodiment as follows: the coupling portion 13" of the electronic device 10" includes a plurality of retaining notches 131" for positioning and a plurality of housing notches 132" for housing, and the fastening unit 22" includes a plurality of lock arms 221" and a plurality of support arms 222".

More specifically, the retaining notches 131" and housing notches 132" are located on the upper wall 115 of the body 11 proximate the circumference thereof. Each lock arm 221" is substantially formed in an L shape. The lock arms 221" and support arms 222" are extended from the lower wall 116 of the body 11 proximate the circumference thereof. Even more specifically, the retaining notches 131" are located on the upper wall 115 remote from at least one USB 12. The housing notches 132" are located on the upper wall 115 proximate the USB 12. Moreover, the lock arms 221" are located on the lower wall 116 remote from USB 12, and the support arms 222" are located on the lower wall 116 proximate the USB 12. Each retaining notch 131" includes a notch bottom wall 1311", a notch side wall 1312" extended from the notch bottom wall 1311", a notch upper wall 1313" extended from the notch side wall 1312" and an elastic first latch structure 1314" located on the notch upper wall 1313". The lock arm 221" has an inelastic second latch structure 223" on an inner wall of a distal end thereof.

Thus, during assembly of the electronic device assembly structure 1", the first electric insertion socket 212' is electrically inserted into the USB 12 of one electronic device 10", while the second electric insertion socket 213' is electrically inserted into another USB 12 of another electronic device 10", hence one electronic device 10" and another electronic device 10" can form electric and signal conduction through the electric connection socket 211'; meanwhile, the lock arms 221" of one electronic device 10" are latched on the retaining notches 131" of another electronic device 10", while the support arms 222" of one electronic device 10" are held in the housing notches 132" of another electronic device 10".

It is to be noted that a stronger force is needed to latch the lock arm 221" into or remove from the retaining notch 131" to make the elastic first latch structure 1314" retract into the notch upper wall 1313" of the retaining notch 131" while the first latch structure 1314" is in contact with the second latch structure 223".

Efficacy of the Embodiments

According to the embodiments of the invention previously discussed, when the electronic device assembly structure is assembled, multiple electronic devices can be fastened in an integrated manner through the connection module to save time and manpower needed. Moreover, during assembly all the elements are visible clearly, hence assembly error and damage of the elements also can be reduced.

In addition, with the electronic devices and connection module adopting the modular design, fabrication difficulty can be reduced and product consistency can be enhanced, and development of molds and circuit design are not needed, therefore production cost can be greatly reduced.

Moreover, the electronic device assembly structure of the invention allows the number of electronic devices to be increased or decreased (to add or reduce functions of the electronic device assembly structure) according to user's requirements, thus it can be widely utilized.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An electronic device assembly structure, comprising:
two electronic devices each including a body and at least one Universal Serial Bus (USB) located on the body, the body including an upper wall and a lower wall corresponding to each other, and a plurality of retaining notches and a plurality of housing notches that are located on the upper wall, each of the plurality of retaining notches including a notch bottom wall, a notch side wall extended from the notch bottom wall, a notch upper wall extended from the notch side wall and an elastic first latch structure which is located on the notch upper wall and enables to retract into the notch upper wall of the retaining notch; and
a connection module which connects the two electronic devices respectively and includes an electric connection unit and a fastening unit including a plurality of lock arms and a plurality of support arms that are extended from the lower wall of the body, each of the plurality of lock arms including an inelastic second latch structure located on an inner surface of a distal end thereof;
wherein the electric connection unit is electrically inserted into the Universal Serial Buses of the two electronic devices respectively, and the fastening unit latches the bodies of the two electronic devices together in an integrated manner.

2. The electronic device assembly structure of claim 1, wherein the body includes a left wall and a right wall corresponding to each other, and a coupling portion which includes at least four latch slots located on the left wall and the right wall opposing each other and remote from the Universal Serial Bus.

3. The electronic device assembly structure of claim 1, wherein the electric connection unit includes an electric connection socket, a first electric insertion socket and a second electric insertion socket, the first electric insertion socket and the second electric insertion socket being extended from two opposite ends of the electric connection socket.

4. The electronic device assembly structure of claim 1, wherein the fastening unit includes at least two latch elements each including a connection arm and two latch arms extended from two ends of the connection arm.

* * * * *